United States Patent
Shapiro

[11] Patent Number: 5,900,997
[45] Date of Patent: May 4, 1999

[54] HEADREST APPARATUS FOR FORWARD VIEWING FROM FACE DOWN POSITION

[76] Inventor: Michael Shapiro, 3636 Camino Del Rio North, Suite 160, San Diego, Calif. 92108

[21] Appl. No.: 08/806,058

[22] Filed: Feb. 25, 1997

[51] Int. Cl.⁶ .............................. G02B 5/08; G02B 7/182; A61G 7/00
[52] U.S. Cl. ...................... 359/857; 359/856; 359/862; 5/908
[58] Field of Search .................................. 359/857, 856, 359/862; 5/908

[56] References Cited

U.S. PATENT DOCUMENTS

| | | | |
|---|---|---|---|
| 2,947,009 | 8/1960 | McKenzie | 5/2.1 |
| 4,161,352 | 7/1979 | Felix et al. | 359/862 |
| 4,375,316 | 3/1983 | Le Vantine | 359/842 |
| 4,531,813 | 7/1985 | Van den Berg | 359/862 |
| 4,759,621 | 7/1988 | Hawkins | 359/862 |
| 4,856,997 | 8/1989 | Mellecker | 359/862 |
| 5,408,713 | 4/1995 | Stratton et al. | 5/632 |

*Primary Examiner*—Cassandra Spyrou
*Assistant Examiner*—Mohammad Y. Sikder
*Attorney, Agent, or Firm*—Thomas J. Tighe

[57] ABSTRACT

For a person who for whatever reason is required to remain prone, i.e. lying face downward, for long periods of time, a parallelepiped housing has a cushion top for comfortably supporting the head of the person. The cushion top defines an opening ("view port") through which the person can look into the housing. Within the housing is a series of mirrors for redirecting the person's field of vision from downward to forward through an front aperture defined by the housing. Preferably the aperture is the absence of a front wall. A manually turned crank reachable by the person allows the person to selectively vertically adjust the his or her field of vision. In the preferred embodiment, the crank rotates a plurality of eccentric cams which pivot a mirror either forward or backward depending on the direction of rotation. This cushion top slides in relation to the housing enough to move the view port away from the mirrors and into a position at which the person can read a book or such supported by an external shelf affixed to the housing, preferably a folding shelf. This invention is particularly useful for patients recovering from certain eye surgery and those having had back surgery or back skin grafts, or an alternative resting position for paraplegics.

17 Claims, 2 Drawing Sheets

HEADREST APPARATUS FOR FORWARD VIEWING FROM FACE DOWN POSITION

BACKGROUND OF THE INVENTION

This invention relates in general to devices for providing a headrest for persons in a prone position (lying face downward) and for redirecting the person's field of view from downward to forward. (As used herein the terms "forward", "rearward", "side", "front", "back" and such are arbitrary references used only for clarity of description.)

This invention is extremely useful for patients recovering from surgery, primarily ophthalmic patients who must remain prone, i.e. lying face downward, for extended periods to ensure proper healing after eye surgery. It provides the patient with a comfortable head support while prone and allows the viewing of television, a computer monitor, guests, or a desired view of the person's surroundings. This invention relieves boredom and prevents sensory deprivation for such patients.

Persons who undergo surgery such as a vitrectomy for repair of retinal damage must remain prone for two to four weeks after surgery. The back of the eyeball is lined with a thin layer of neural tissue which senses points of light. The vitreous humor is a clear, gel-like substance which fills the concavity of the retina in the rear globe of the eye behind the lens. It is encased in a membrane which is attached to the retina at various points. Sometimes the structure of the membrane and gel breaks, causing a portion of the membrane and vitreous to separate from the retina, resulting in retinal tears or breaks. These breaks may require surgery and the instillation of a gas bubble into the vitreous cavity to hold the retina in place while the retina reattaches to the back of the eyeball. The gas bubble provides internal support for the vitreous humor membrane to allow it to reattach to the retina. For this gas bubble to most effectively aid in the reattachment of the retina, it must press the retina against the back of the eyeball, requiring the patient to maintain a prone position to assure accurate positioning of the gas bubble. Patients who have completed such ophthalmic surgery are informed of the necessity of keeping the gas bubble in the proper position for optimal healing and are most concerned with ways of maintaining the prone position for two to four weeks. It is because of this concern and necessity to remain prone for extended periods of time that the apparatus of this invention was designed.

This invention allows the person to maintain a comfortable prone position during the lengthy healing period and also provides relief from boredom and sensory deprivation by allowing for the comfortable viewing of a television set, computer monitor, books or magazines or face to face conversations without moving the head and body.

Other types of recovering surgery patients such as those having undergone spinal surgery or back skin grafts who must also maintain a prone position, can use this invention to aid in their recovery. Others, such as paraplegics will find it helpful to allow the use of a different position than they are normally required to use.

Other advantages and attributes of this invention will be readily discernable upon a reading of the text hereinafter.

SUMMARY OF THE INVENTION

An object of this invention is to provide a comfortable headrest and a generally forward view for a person in a prone position.

Another object of this invention is to prevent the boredom and sensory deprivation of persons required to maintain a prone position for long periods of time by providing such persons the opportunity of a generally forward view.

Another object of this invention is to provide the ability to view television, other persons, and/or other objects while comfortably supporting a person's head in the face down position.

An additional object of this invention is to provide an apparatus which will allow a person to comfortably maintain a prone position for long periods of time and still be able to view television, computer monitors, persons, other objects and documents.

An additional object of this invention is to comfortably provide a generally forward view, with the ability of adjusting the vertical plane of such view, to a person required to maintain a prone position for long periods of time.

An additional object of this invention is to provide a comfortable surface to support a person's head while laying in the prone position.

An additional object of this invention is to provide a comfortable surface to support a person's head and arms while laying in the prone position.

A further object of this invention is to comfortably provide persons required to maintain a prone position for long periods of time the ability to directly view books, magazines, documents or other objects.

These objects, and other objects expressed or implied in this document, are accomplished by a headrest, a housing vertically supporting the headrest, a side opening defined by the housing, a view port defined by the headrest, mirror means, within the housing and aligned with the view port, for redirecting the field of vision of a person looking down through the view port through the side opening. This invention allows the person to lie on a bed with his head supported on the cushioned top of the housing so that his or her eyes are in line with the viewing port, allowing the person to view, through mirrors, a subject such as a television set positioned in front of the apparatus. In the preferred embodiment, the image of the subject is reflected off a fixed mirror in a bottom of the housing to an adjustable mirror at a rear of the housing where it is reflected again through the view port to the person's eyes. Either the rear mirror can be adjusted or both mirrors could be adjusted as a combination. An adjustment knob on the side of the housing allows the person to be able to selectively adjust the vertical field of view. Preferably the headrest is coupled to the top of the housing by slidable rails which allow it to be retracted partially to align the viewing port over an external shelf of the housing, preferably a folding shelf, which can hold a book, magazine or such for the person to read without lifting his or her head.

DESCRIPTION OF THE PREFERRED EMBODIMENT

Figure 1:
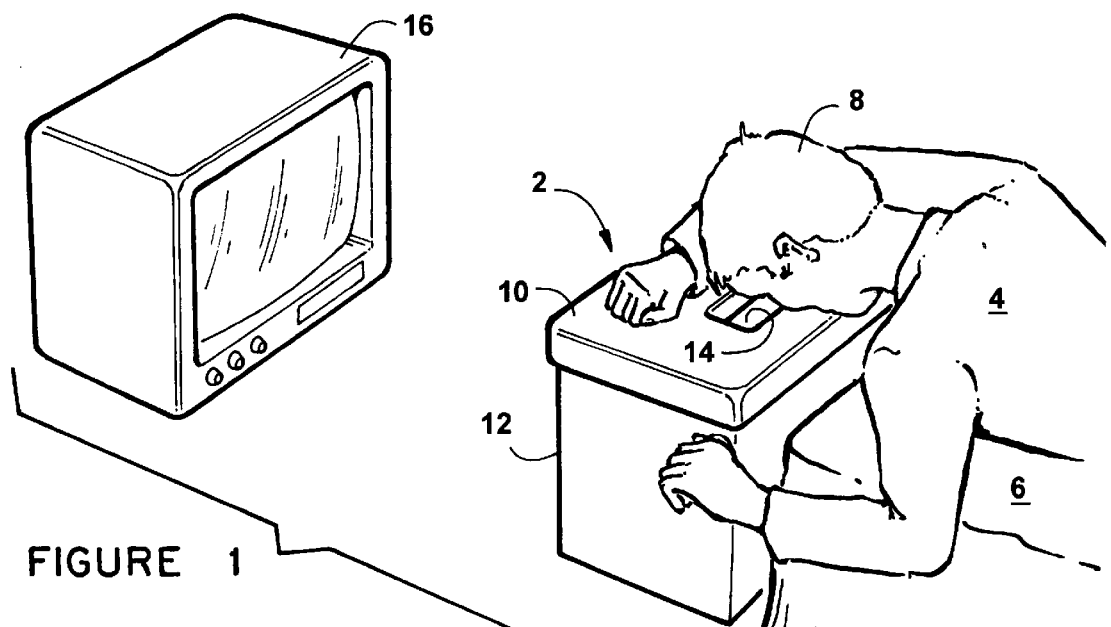
FIG. 1 is a pictorial view of this invention in use.
Figure 3:
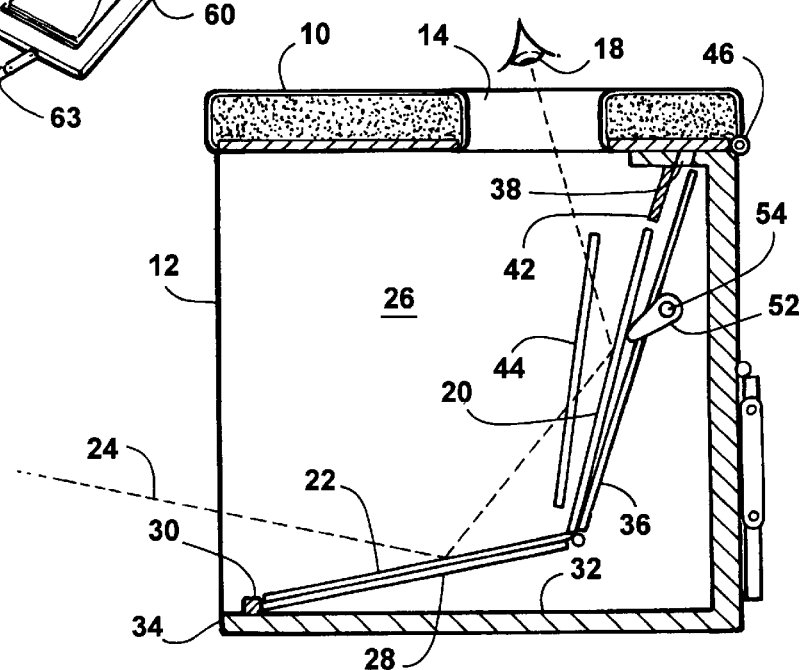
FIG. 3 is a cross-sectional view taken along a median plane of the invention, this view illustrating a viewing port, mirrors and line of sight in relation to a user's eye.

Referring to FIGS. 1 and 3, the apparatus of this invention, generally designated 2, is shown in use by a person 4 who is lying face downward, i.e. in a prone position, on a bed 6 or similar support. The person's head 8 is being comfortably supported by a cushioned head support 10 which is attached to a housing 12 of the invention. The person's head is positioned so that his eyes 18 are directly over a viewing port 14 defined by the head support. In this position, the person's field of view is redirected from downward to forward through a front (an arbitrary reference only) opening in the housing in order to view objects, such as a television set 16. The field of view is redirected by a series of mirrors, illustrated herein to be an upper mirror 20 and a lower mirror 22. The path of such redirection is generally illustrated by a ray of light 24, travelling from an object forward of the person, reflected by the lower mirror onto the upper mirror which in turn reflects it through the viewing port and into the person's eyes. Thus the mirrors provide a generally forward field of view for a person who is looking straight down into the housing through the view port.

The invention is generally used in conjunction with a bed and is placed on the floor, generally next to the end of the bed. Its top surface is standard bed height in order to encourage the proper positioning of the head while prone. Besides enabling a prone person to view a television set, the person can also view a visitor by means of the invention, allowing the person to conduct more meaningful conversations while still maintaining a prone position. The head support is large enough to also allow the person's arms to rest on the head support. This makes it easier for the person to stay comfortable for the long periods necessary when the person must maintain a prone position. The person may support either arm, or both arms on the head support. There is room on the support to allow the arms to be bent and to rest forward of the top of the person's head.

The housing and cushioned head support preferably have a generally cubical shape approximately two feet high, wide and deep. This allows the invention to be placed on the floor next to the end of a standard bed and will allow a person to lay on the bed with his forehead comfortably supported on the cushion. If differences in height exist they can easily be adjusted. For example, if the cushion is too high then the person can be raised by the use of pillows; if the cushion is too low then the apparatus can be raised by placing stable supports beneath it. The mirrors are approximately twelve inches long and are up to eighteen inches wide, sufficient to extend between the inside side walls of the housing. They can be as thin as one-eighth inch but preferably are three-sixteenths to one-quarter inch thick. The mirrors can be first surface mirrors, but standard rear surfaced mirrors provide satisfactory results.

The cushioned head support is preferably about three inches thick, consisting of soft foam material for padding covered by a durable and washable plastic cover. The covered foam is secured to a wood or rigid plastic backing. The cushioned support is designed to comfortably support a person's head for long periods of time. The viewing port through the cushion is large enough to allow a user an unobstructed view of the mirrors and unobstructed breathing. Since maintaining a prone position for long periods of time can become quite tiresome, the head support is designed to be large enough for the person to be able to rest one or both arms on the support. There is sufficient room to allow the person's arms to be bent and placed on the support forward of the person's head. This allows the person to be able to shift his body position as freely as possible and still maintain a prone position on the apparatus. The housing is as wide as the head support to provide as wide a field of view as possible while providing ample support for the head support. Although the housing can be made from any material suitable for providing the structure and support described herein, a plastic or metal construction is preferred since they can be hygienically sanitized.

Figure 4:
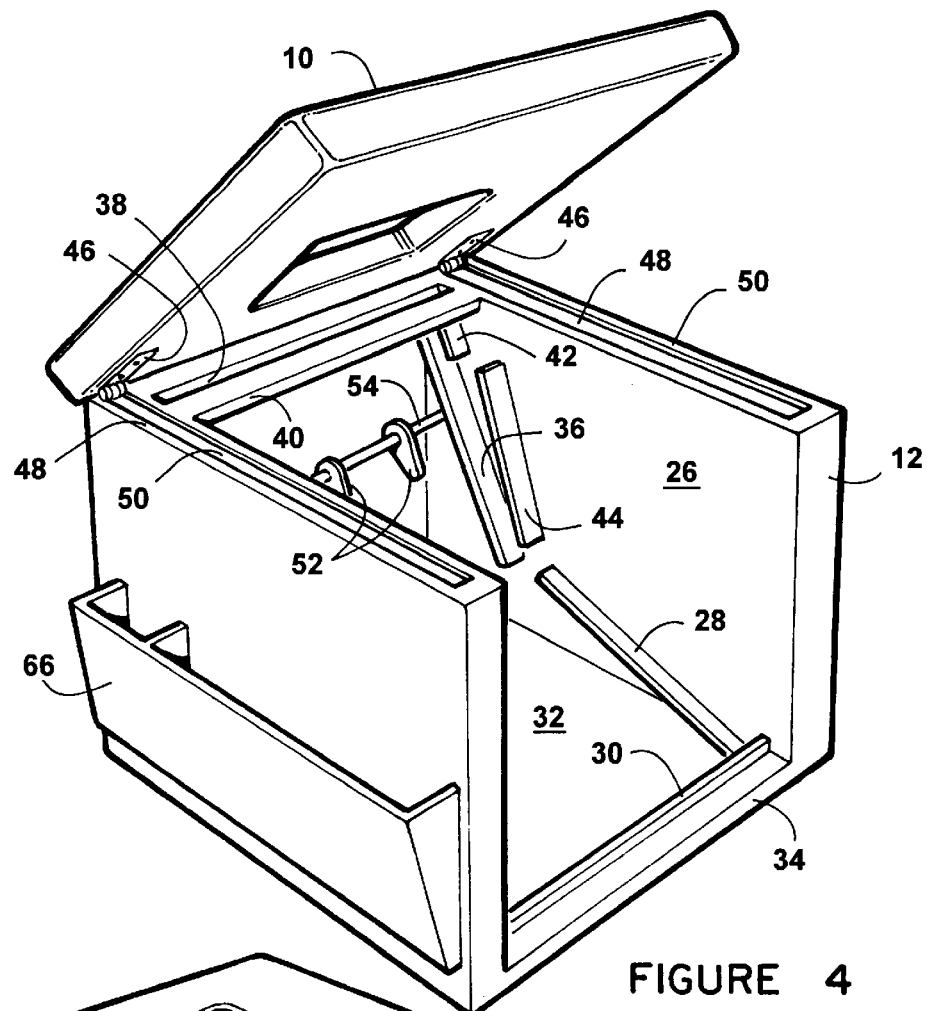
FIG. 4 is a pictorial view of the invention with the cushioned head support raised to illustrate mirror supports and adjusting arms.
Figure 5:
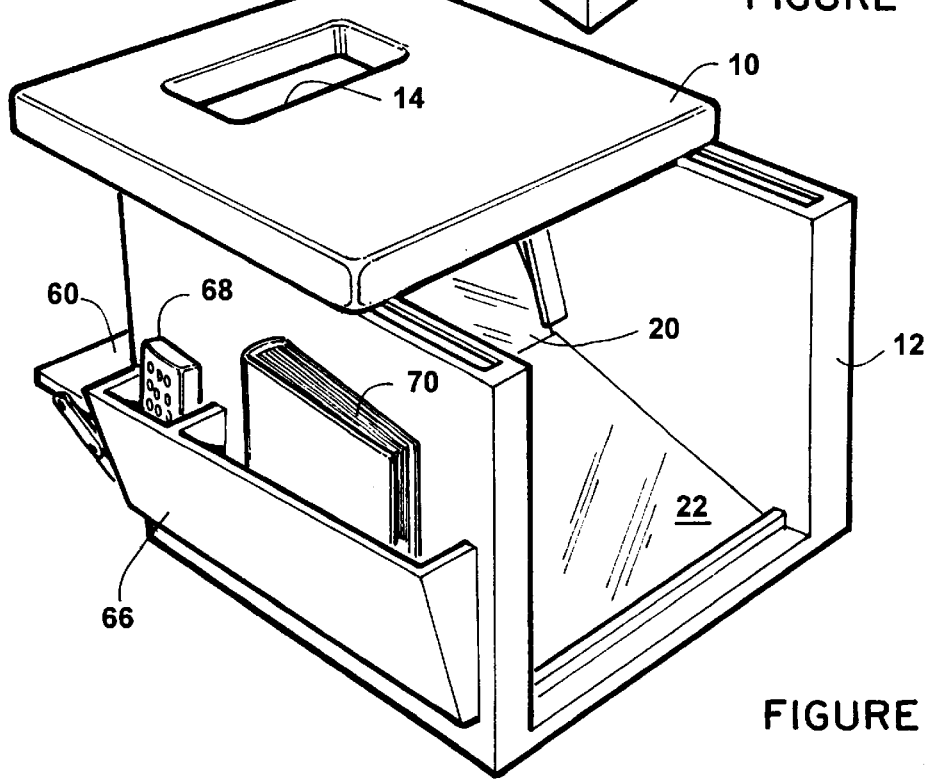
FIG. 5 is a front pictorial view of the invention with the cushioned head support disposed as in FIG. 2.

Referring to FIGS. 3–5, the upper and lower mirrors, 20 and 22, are rectangular and each extends from side to side of the housing 12, and with the viewing port 14 are preferably centered with respect to the median plane of the housing, the median plane being a plane normal to the head support 10 and running through the middle of the housing lengthwise. The median plane is generally in the center of a user's lateral range of view depending on the orientation of the user's head with respect to the view port. The mirrors are mounted so as to be at all times in planes normal to the median plane. The lower mirror 22 is supported along its lateral edges by respective inclined flanges 28 projecting inwardly from opposite housing sides 26, and is held in position at its lower edge by a retainer wall 30 affixed to a base 32 of the housing. Preferably the flanges are inclined, front to back, approximately 90 from the plane of the head support.

Referring again to FIGS. 3–5, a lower edge of the upper mirror 20 rests on, or is otherwise supported in close proximity to, the upper edge of the lower mirror 22. As illustrated, the upper mirror can be pivoted on its lower edge within a defined range forward and backward. Backward rotation of the upper mirror is limited by a pair of inclined lateral flanges 36 projecting from opposite sides of the housing 12; they preferably inclined front to back about 75° with respect to the plane of the head support 10. The lateral flanges 36 also act as guides and lateral supports for insertion and removal of the upper mirror through a slot 38 defined by a shelf 40 running along a top margin of the back side of the housing. The lateral flanges 36 align with the back side of the slot and a cross flange 42, projecting downward at an angle from the shelf 40, aligns with the front side of the slot, however the cross flange does not project low enough to interfere with pivoting of the upper mirror. Together the lateral flanges 36 and the cross flange 42 guide an upper mirror through the slot.

Referring again to FIGS. 3–5, forward rotation of the upper mirror is limited by a pair of inclined limit bars 44 which also project from opposite sides 26 of the housing; they are preferably inclined front to back about 85° with respect to the plane of the head support 10. Thus the upper mirror can pivot on its lower edge about 10° between the lateral flanges and the limit bars. This allows an adjustable movement of approximately two inches at the top edge of a twelve inch high upper mirror.

Referring to FIG. 4, the cushioned head support 10 is attached to the housing 12 by hinges 46 which have two pivoting members, one is a standard flange which is fastened to the rear of the bottom of the head support with screws. The other pivoting member of the hinges is a slide 48 which fits in channels 50 defined in the tops of the side walls of the housing. Preferably the slides (not shown) have a cross-section of an inverted "T" and the channels have a corresponding inverted "T" cross-section.

Other hinge/slide combinations can be used, for example, the hinges can be affixed to conventional drawer slides which are attached to the tops of the side walls, which would eliminate the need for channels cut into the side walls. The hinges allow the cushioned head support to be pivoted upward and to the rear to allow access to the inside of the housing. This facilitates insertion and removal of the mirrors, and cleaning of the mirrors. It also makes it easier to make adjustments to the mirrors and their positioners. With the head support pivoted back, the lower mirror can be placed in position by laying it on the lower mirror flanges with its lower edge abutting the lower mirror retainer wall. The upper mirror can then be inserted through the slot and gently guided down until it rests on the lower mirror, or other support piece (not shown) used to avoid resting the upper mirror on the lower mirror. The mirror supports can also be covered by a material that will provide a degree of cushioning, such as felt or thin foam strips.

Figure 2:
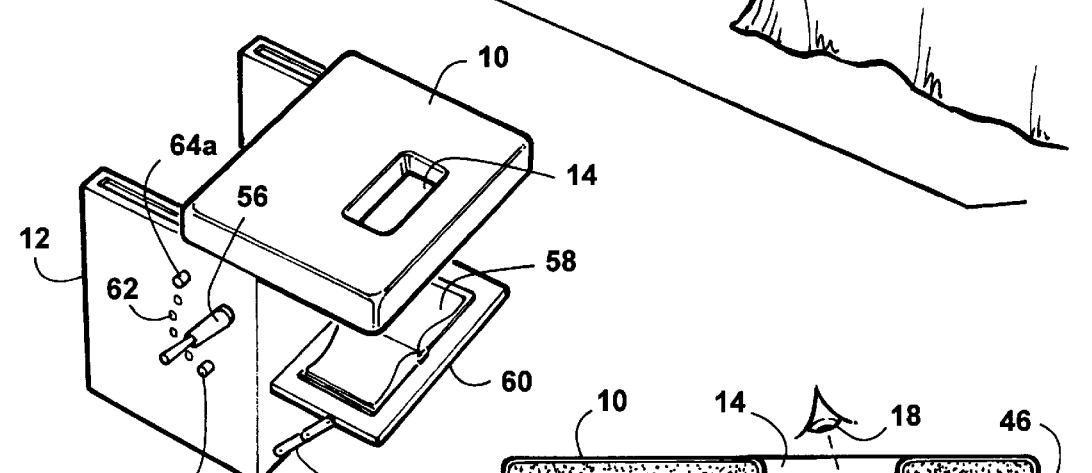
FIG. 2 is a rear pictorial view of the invention with a cushioned head support alternatively disposed for directly viewing a book on a foldable shelf.

Referring to FIGS. 2–4, as explained above, the upper mirror can be pivoted on its lower edge within a range. The angle between the upper and lower mirrors is an obtuse angle ranging from about 104° to about 114° depending on the angle of the upper mirror which can be selectively adjusted within the range by a plurality of cams 52. The cams are rotated by a shaft 54 which is turned by a manually operated crank 56. The cams are disposed behind the upper mirror and the shaft is journaled in the sides 26 of the housing 12. Preferably the shaft is normal to the median plane of the housing with one end of the shaft projecting externally through a housing side, and the crank is coupled to the external end of the shaft. One or more clips (not shown) fastened to the shaft can be used to retain the shaft in place. Preferably at least two cams are used, spaced apart an equal distance on either side of the median plane so that when rotated, their effect on the upper mirror will be balanced. As the crank is turned, the high point of the cams will rotate in unison toward or away from the back side of the upper mirror; this will cause the mirror to pivot forward or backward, respectively, causing the obtuse angle between the mirrors to decrease or increase, respectively, and causing the field of view to raise or lower, respectively. This provides a means by which a user can vertically adjust his or her field of view. The horizontal field of view depends on the width of the mirrors and the front aperture, i.e. the front opening of the housing. The preferred dimensions disclosed herein provide a horizontal field of view that is quite wide and certainly wide enough to view a television screen even as close as two feet away.

Referring to FIGS. 2 and 5, the slides 48 also allow the head support 10 to slide to the rear of the housing sufficient for the view port 14 to be positioned over a folding shelf 60 affixed to the back of the housing. This allows a user to read a book 58 or magazines or such while prone. Preferably the shelf is hinged to the back wall of the housing approximately midway between the base of the housing and the head support. Alternately, the shelf can be made to fold into a recess defined by the back wall so as to be stored flush with the housing when not in use. Preferably the shelf pivots up and is held in position by a pair of foldable braces 63 commonly used for such purposes. Likewise, the shelf could also be mounted so as to fold down and be supported by cantilever braces (not shown).

Referring to FIG. 2, the crank 56 is preferably held in a selected position by use of a spring biased detent (not shown) which can be set into any of a plurality of recesses 62 defined in the side of the housing along an arc defined by stops 64a & 64b. The crank can also be held in selected positions by means of friction, such as friction bearings (not shown) used to journal the shaft 54.

Referring to FIG. 5, a storage rack 66 is preferably affixed to one or more sides of the housing for storing useful items, such as a remote control unit 68 and books 70 or magazines.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the preferred embodiment shows only two mirrors working together to redirect a person's view, but more mirrors or even a prism can be used as the redirecting means. Also, the incline of the lower mirror can be increased or decreased, the range of adjustment of the upper mirror can be increased or decreased, and the position of the view port relative to the mirrors can be more forward or rearward, all of which would effect the angular size and position of a user's vertical field of view, without departing from the scope of the claims hereinafter.

I claim:

1. An apparatus for allowing a person in a face down prone position to see forward without lifting his or her head, the apparatus comprising:
   (a) headrest means for supporting the person's head in said position, said means being large enough to also support at least one arm of the person;
   (b) means for vertical support of the headrest means;
   (c) the headrest means includes a view port formed therein aligned with the person's eyes when the person's head is being supported by the headrest means; and
   (d) means, visually aligned with a person looking through the view port, for redirecting the person's field of vision forwardly.

2. The apparatus according to claim 1 further comprising:
   (a) shelf means, affixed to the means for vertical support, for holding viewable matter; and
   (b) means for slidably coupling the headrest means to the means for vertical support, the headrest means being slidable to an extent at which the view port is disposed over the shelf means.

3. The apparatus according to claim 1 further comprising means for adjusting the means for redirecting to adjust vertically the field of vision.

4. The apparatus according to claim 1 wherein the means for redirecting comprises a plurality of mirrors.

5. The apparatus according to claim 4 wherein the plurality of mirror comprises a first and a second mirror in obtuse relation.

6. The apparatus according to claim 4 wherein the plurality of mirrors comprises:
   (a) a first mirror;
   (b) a second mirror;
   (c) the first mirror reflecting a forwardly view onto the second mirror; and
   (d) the second mirror in turn reflecting the forwardly view through the view port to the eyes of the person.

7. The apparatus according to claim 6 wherein the second mirror is selectively angularly adjustable over a range and adjustment of the second mirror correspondingly adjusts vertically the field of vision.

8. An apparatus for allowing a person in a face down prone position to see forward without lifting his or her head, the apparatus comprising:
   (a) headrest means for supporting the person's head in said position;
   (b) means for vertical support of the headrest means;
   (c) the headrest means includes a view port formed therein aligned with the person's eyes when the person's head is being supported by the headrest means; and (d) means, visually aligned with a person looking through the view port, for redirecting the person's field of vision forwardly, said means comprising at least a first and a second mirror in obtuse relation.

9. The apparatus according to claim 8 further comprising means for adjusting the means for redirecting to adjust vertically the field of vision.

10. The apparatus according to claim 8 wherein the first mirror reflects a forwardly view onto the second mirror, and the second mirror in turn reflects the forwardly view through the view port to the eyes of the person.

11. The apparatus according to claim 10 wherein the second mirror is selectively angularly adjustable over a range and adjustment of the second mirror correspondingly adjusts vertically the field of vision.

12. The apparatus according to claim 8 further comprising:

(a) shelf means, affixed to the means for vertical support, for holding viewable matter; and (b) means for slidably coupling the headrest means to the means for vertical support, the headrest means being slidable to an extent at which the view port is disposed over the shelf means.

13. An apparatus for allowing a person in a face down prone position to see forward without lifting his or her head, the apparatus comprising:

(a) headrest means for supporting the person's head in said position;

(b) means for vertical support of the headrest means;

(c) the headrest means includes a view port formed therein aligned with the person's eyes when the person's head is being supported by the headrest means;

(d) means, visually aligned with a person looking through the view port, for redirecting the person's field of vision forwardly;

(e) shelf means, affixed to the means for vertical support, for holding viewable matter; and (f) means for slidably coupling the headrest means to the means for vertical support, the headrest means being slidable to an extent whereat the view port is disposed over the shelf means.

14. The apparatus according to claim 13 further comprising means for adjusting the means for redirecting to adjust vertically the field of vision.

15. The apparatus according to claim 13 wherein the means for redirecting comprises a plurality of mirrors.

16. The apparatus according to claim 15 wherein the plurality of mirrors comprises:

(a) a first mirror;

(b) a second mirror;

(c) the first mirror reflecting a forwardly view onto the second mirror; and (d) the second mirror in turn reflecting the forwardly view through the view port to the eyes of the person.

17. The apparatus according to claim 16 wherein the second mirror is selectively angularly adjustable over a range and adjustment of the second mirror correspondingly adjusts vertically the field of vision.

\* \* \* \* \*